United States Patent [19]

Farkas et al.

[11] Patent Number: 4,785,073
[45] Date of Patent: Nov. 15, 1988

[54] MELAMINE-PHENOL-FORMALDEHYDE RESOLE MODIFIED BY GLYCOLS MOULDING COMPOSITION

[75] Inventors: Robert Farkas, Bishops Stortford; Lothar M. Hohmann, London, both of England

[73] Assignee: Polymer Tectonics Limited, London, England

[21] Appl. No.: 723,957

[22] PCT Filed: Aug. 13, 1984

[86] PCT No.: PCT/GB84/00281

§ 371 Date: Apr. 11, 1985

§ 102(e) Date: Apr. 11, 1985

[87] PCT Pub. No.: WO85/00822

PCT Pub. Date: Feb. 28, 1985

[30] Foreign Application Priority Data

Aug. 16, 1983 [GB] United Kingdom ................ 8322059

[51] Int. Cl.$^4$ ..................... C08G 14/10; C08G 14/06; C08L 61/34
[52] U.S. Cl. .................................... 528/163; 525/480; 525/504; 528/140; 528/147; 528/153; 528/158; 264/331.12; 264/331.22; 524/389
[58] Field of Search ............... 528/147, 153, 163, 158, 528/140; 525/480, 504; 264/331.12, 331.22; 524/389

[56] References Cited

U.S. PATENT DOCUMENTS

| 2,667,466 | 1/1954 | Nagy ............................ 528/153 X |
| 2,748,101 | 5/1956 | Shappell ....................... 528/147 X |
| 2,826,559 | 3/1958 | Updegraff et al. ............. 528/163 X |
| 3,036,028 | 3/1962 | Malashevitz ................... 528/163 X |
| 3,070,572 | 12/1962 | Oland et al. ................... 528/163 X |
| 3,131,086 | 4/1964 | Nyquist et al. ................ 528/147 X |
| 3,321,551 | 5/1967 | Knutsson ....................... 528/163 X |
| 3,364,167 | 1/1968 | Imai et al. .................... 528/163 X |
| 3,434,992 | 3/1969 | Holtschmidt et al. .......... 528/140 X |
| 4,229,557 | 10/1980 | Feinauer et al. ............... 528/158 X |

FOREIGN PATENT DOCUMENTS

| 869984 | 12/1978 | Belgium . |
| 503537 | 6/1954 | Canada ............................... 528/163 |
| 860420 | 1/1971 | Canada ............................... 528/163 |
| 44552 | 1/1969 | Japan ................................. 528/163 |
| 6016515 | 2/1981 | Japan ................................. 528/163 |
| 7403014 | 9/1975 | Netherlands . |
| 426265 | 6/1967 | Switzerland . |
| 1363227 | 8/1974 | United Kingdom . |

OTHER PUBLICATIONS

Chem. Abstracts, vol. 99, 23707u, Jul. 1983, Mitsui Toatsu Chemicals.
Encyclopedia of Chemical Technology, vol. 2, 1964, pp. 41–42 and 50–54, Kirk-Othmer.

Primary Examiner—Howard E. Schain
Attorney, Agent, or Firm—Cushman, Darby & Cushman

[57] ABSTRACT

A series of melamine-phenol-formaldehyde resoles for pressure-free to low pressure, low/medium temperture conversion into moulded product. The molar ratio of melamine:phenol is the range 1:4.7 to 1:0.29; for each mole of melamine there are 1.5 to 3 moles of formaldehyde; and for each mole of phenol there are 1.2 to 2 moles of formaldehyde. The resin compositions may contain fillers/reinforcing fibers, glycols and water curing is at or near neutral pH and may be accelerated by the use of boric oxide or acid and also by microwave heating. Moulded products have good heat-and fire-resistance, and good smoke emission properties, and are non-toxic.

5 Claims, No Drawings

MELAMINE-PHENOL-FORMALDEHYDE RESOLE MODIFIED BY GLYCOLS MOULDING COMPOSITION

This invention relates to moulding compositions, and is especially concerned with the provision of a novel series of easily handleable, low temperature and low-pressure curable resins which may be used for moulding, casting, in the preparation of bulk (dough) and sheet moulding compositions, resin injection, in gel coats, and in the manufacture of what are known in the art as "pre-pregs", both with and without the addition of fillers.

It is well known that phenols and substituted phenols can be reacted with aldehydes, e.g. formaldehyde, to give a range of thermosetting resins which are normally referred to as "phenolics". These resins are produced by partially condensing a mixture of the phenol and the aldehyde, suitably with the assistance of an alkali catalyst, to the stage at which a so-called "resole" resin, or A-stage resin, is formed. This resin is then shaped, e.g. in a mould to produce a moulded object or a surface coating or lamination, and its cure is completed by heating and/or catalytic effect. The manufacture and use of such resins are exhaustively described in the literature.

It is also known for various additives to be included in the resole, or indeed in the reactive mixture which produces the resole, before curing and such additives include, for example, fillers, pigments and plasticisers.

These phenol-aldehyde resins have achieved wide success in many fields of application, but suffer from certain disadvantages. For example, although neutral curing is possible, it is uneconomic since it takes a long time and requires high temperatures (e.g. 125°–165° C.) and elevated pressures (e.g. 300–1000 p.s.i.). For practical purposes, therefore, the resins must be acid-cured. The presence of an acid catalyst in the resin system places limitations on the choice of filler and reinforcements which may be used, since the acid will attack, for example, glass fibre, pigments and fire-retarding additives. The acid present may also attack and corrode the equipment being used, and can constitute a hazard to the operators. Furthermore, acid may leach out of the final moulded product, e.g. due to the action of water thereon, and this may attack, for example metals, concrete and other materials in contact with, or in the proximity of, the moulded or foamed product.

A further disadvantage of known phenol-aldehyde resins is their lack of colour stability. This is an inherent characteristic of commercial phenolics, and in any event discolouration of phenolics is greatly accelerated by the presence of acidity in the moulding.

Resins are also widely known and used which are made by a similar reaction to that described above, but involving an amino compound and aldehydes, for example melamine and/or urea and formaldehyde. Such resins are known in the art as "aminoplasts", and are widely used in high pressure moulding compounds. Conventional aminoplasts tend to be very brittle, however, are usually high melting point powders, and are not very reactive at pH 7.0 or above. Thus, in commercial use the aminoplast moulding composition must necessarily contain a high proportion of reinforcing filler, high temperatures and pressures must be used to provide flow and fast cure and prevent gassing; and acid or latent acid catalysts are often used for curing, with the attendant difficulties mentioned above in connection with phenolics.

Both phenolics and aminoplasts may be formed into foamed products, and UF foams are especially to be noted. Such foams also prevent problems, however. Thus, a high proportion of water is necessary in the resole to produce flow of the resin and thus cure. The resins tend to be brittle. The products tend to shrink, due to polymerisation and loss of water, added or formed. Acid or latent acid catalysts are normally used for the cure (see above), and the final products are weak and not chemically resistant.

It is an object of the present invention to provide a novel series of thermosetting resinous materials, suitable as moulding compositions, which do not suffer from the drawbacks of the known phenolics and aminoplasts, and especially to provide such materials which can be cured at mildly acid or about neutral pH, and at relatively low temperatures and pressures. It is a further object of the invention to provide such materials which are colour stable.

According to the present invention there is provided a melamine-phenol-formaldehyde resole wherein the molar ratio of melamine:phenol is in the range 1:4.7 to 1:0.29; wherein for each mole of melamine ther are 1.5 to 3 moles of formaldehyde; and wherein for each mole of phenol there are 1.2 to 2 moles of formaldehyde, the formaldehyde requirements being additive.

The term "phenol" as used herein is intended to embrace not only phenol itself but also phenols which are substituted in such a way that a thermosetting resin is obtained. Examples include cresol, e.g. m-cresol, xylenol, and ethyl phenol. The phenol component of the resole may also contain a minor amount of resorcinol.

The resoles of the invention may also contain small amounts of urea or a substituted urea in addition to melamine. For example, up to 40% by weight of the melamine may be substituted by urea or a substituted urea. For each mole of urea or substituted urea there will be 1.6 to 2.0 moles of formaldehyde.

Preferably the molar ratio of malamine:phenol is in the range 1:3.5 to 1:0.29. Preferably, for each mole of phenol there are 1.5 to 1.8 moles of formaldehyde.

The novel resoles of the invention are suitably produced by co-condensing the phenol and melamine with formaldehyde at elevated temperatures under mildly alkaline conditions, for example using sodium hydroxide or potassium hydroxide to catalyse the co-condensation. Other methods of production include:

(a) heating a blend of pre-condensates of melamine and formaldehyde and phenol and formaldehyde;

(b) condensing a phenol-formaldehyde resole pre-condensate with melamine;

(c) condensing a melamine-formaldehyde resole pre-condensate with phenol.

As mentioned above, some of the melamine may be replaced with urea or a substituted urea. In a particularly suitable production method, a phenol-formaldehyde pre-condensate is reacted with a small proportion of the melamine, and the co-condensate so formed is then further condensed with the remainder of the melamine.

Moulding compositions according to the invention suitably also contain a proportion of a glycol or glycol derivative. The glycol or glycol derivative functions as a reactive plasticising diluent by partially condensing with the methylolphenols and methylolmelamines at elevated temperatures to produce ether side chains, and also acts as an external plasticiser. It augments the toughness, resilience, dimensional stability and weathering properties of shaped products made from the compositions of the invention. The glycol or glycol derivative is suitably introduced into the compositions of the invention at a late stage in the production of the melamine-formaldehyde resole. Thus, for example, towards the end of the co-condensation reaction the glycol or glycol derivative is blended with the hot resinous syrup in a quantity determined by the chemical structure of the co-condensate being formed. The preferred minimum quantities of glycol or glycol derivative are 15% by weight of the phenol in the co-condensate plus 50% by weight of the melamine in the co-condensate. Preferably, the glycol or glycol derivative is added in an amount of 20% by weight of the phenol in the co-condensate plus 60% by weight of the melamine in the co-condensate. As an example, a resole with a molar ration of melamine:phenol of 1:4.7 would require the addition of approximately 20% by weight of glycol or glycol derivative on this basis, and a resole with a melamine:phenol molar ratio of 1:0.29 would require approximately 40% of added glycol or glycol derivative.

Suitable glycols include those lower glycols which are liquid at room temperature and whose molecules contain reactive primary and/or secondary hydroxyl groups. As specific examples there may be mentioned ethylene glycol, triethylene glycol, monopropylene glycol, dipropylene glycol, tripropylene glycol, butylene glycol, polyethylene glycols and polypropylene glycols. Particularly suitable glycols are monopropylene glycol, dipropylene glycol, triethylene glycol, monoethylene glycol and polyethylene glycols of low average molecular weight, the first three in this list being especially preferred. Glycol derivatives such as the ethers and esters of lower glycols, monoglyceryl cresyl ether and substituted polypropylene glycols are also useful as the glycol component of the compositions of the invention. It should be noted that mixtures, containing more than one glycol component, may be used in accordance with this aspect of the invention. The glycol component reduces the viscosity of the resole, so facilitating handling, and also stabilises it against further co-condensation and cross-linking during storage.

The resin system may also contain a minor proportion of water, which may be bound or unbound, suitably up to 35% by weight, based on the weight of resole. If the composition of the invention is to include a filler, a further amount of water may be added, suitably not more than 5% by weight based on the filler. The resin system may also contain a glycol ether as a diluent to facilitate processing, at up to 20% by weight of the resole plus glycol component.

The resin system of the invention may also contain a small proportion of polyvinyl alcohol, suitably in an amount up to 15% by weight, based on the weight of the resole. This reduces cross-linking, by virtue of the resole reacting with the —OH groups of the polyvinyl alcohol, and blocking off the cross-linking positions, and improves the resilience and reduces shrinkage in the moulded products made from the system of the invention.

As mentioned, the co-condensation of the ingredients of the resole is conducted under mildly alkaline conditions, suitably in the presence of an alkaline metal hydroxide catalyst such as sodium hydroxide or potassium hydroxide in an amount sufficient to maintain the pH of the reaction in the range 7.2 to 8.5, preferably in the range 7.3 to 8.0.

The formaldehyde used in the co-condensation is suitably in the form of its aqueous solution "formalin", optionally in admixture with the solid polymer paraformaldehyde, or else paraformaldehyde alone, depending on the composition of the co-condensate.

If desired, the pH of the resole can be adjusted with various acids to neutral or slightly acidic, suitable acids for this purpose including butyl acid phosphate, aromatic and aliphatic sulphonic acids, lower carboxylic acids, boric acid or combinations of these.

The moulding compositions of the invention may contain fillers if desired. Typical fillers include zinc oxide, magnesium carbonate, magnesium hydroxide, clays, mica, talc, silica, calcium carbonate, dolomite, gypsum (Plaster of Paris) magnesite, pigments such as titanium dioxide, and aluminium hydroxide, otherwise known as "alumina trihydrate". This later material is a particularly useful filler, and is known for its fire-retardant and smoke emission suppressing properties. Alumina trihydrate has not been used with conventional melamine-formaldehyde or phenol-formaldehyde resins, because such resins have normally been cured under acid conditions. Alumina trihydrate can, however, be used in the compositions of the present invention, and thereby add to the desirable properties of those compositions because of the neutral-curing characteristics of the novel resoles.

In compositions according to the invention where alumina trihydrate is the sole filler, it may be present in an amount of 200 to 550% by weight of the resole for low-pressure moulding materials. When other fillers are present, the alumina trihydrate is preferably used in an amount up to about 350% on the same basis. Higher loadings of filler are suitable in the preparation of high-pressure moulding compounds, i.e. those processed by dough and sheet moulding, hot press moulding, pultrusion and extrusion.

The resin system may also contain reinforcing fibres for some applications, and here may be mentioned, by way of example, glass, nylon, cellulose and other organic fibres such as aramids, e.g. "Kevlar"; carbon fibres, metal fibres; silicate based and other mineral fibres.

Curing, after shaping, of the moulding compositions of the invention may take place in closed or open heated moulds, with or without the application of pressure. Alternatively, curing may take place by stoving the shaped article in a thermostatically-controlled circulating air oven, or by means of microwave (900 to 2500 MHz) or high frequency (27 to 65 MHz) heating. The precise conditions of the curing will normally be dependent upon the formulation of the composition, the mould design and the pressure. It is an important feature of the invention that curing may take place at or about neutral pH, i.e. at a pH within the range 6.8–7.2. If desired, and appropriate, curing may be preformed at a pH in the range 4.0 to 8.6, with a pH of no less than 2.5 or no greater than 9.5 being tolerated temporarily. Indeed, best results are obtained if the pH of the composition before curing is adjusted to be mildly acid, e.g. pH 4 to 6; and curing takes place such that the pH gradually rises to neutral towards the end of curing or during ageing. This can be achieved by including in the composition an alkaline donor which might be a filler, or melamine or related compound. The effect is that the cured product contains no acid which may subsequently leach out and corrode.

Curing may take place over a period up to 5 hours, but preferably the time of cure is between 1 minute and 2 hours, suitably between 1 minute and 1 hour. High frequency and microwave heating can normally accomplish curing in 1 to 15 minutes. The temperature of curing will normally be determined as to its upper limit by frothing (gassing) of the materials. At atmospheric pressure the temperature of cure will normally not exceed 96° C.; under pressure, the temperature of cure will normally not exceed 145° C.

The pressure under which the shaped products are cured may be in the range atmospheric to 1000 p.s.i.g. High moulding pressures of course permit high curing temperatures, with a consequent reduction in cure time.

In order to achieve neutral cure at the required speed, the following factors are important:
 (i) a sufficiently high melamine:phenol ratio;
 (ii) as low a reactive glycol presence as possible;
 (iii) the minimum free water content;
 (iv) use of an accelerator;
 (v) use of the maximum practicable cure temperature.

These may be further explained as follows:

1. When curing is to take place at temperatures less than 96° C. and under atmospheric pressure, the melamine content should be such that the melamine:phenol molar ratio is at least 1:2.5. When curing is to take place in the temperature range 115°–140° C., there should be sufficient melamine for the melamine:phenol molar ratio to be at least 1:3. In this temperature range, the working pressure is normally above atmospheric pressure.

2. The reactive glycol content will be partly dependent on the amount and type of filler or other reinforcement which may be present. However, it is preferred that the glycol should be present in an amount of at least 8%, preferably at least 10%, by weight based on the weight of the melamine:phenolformaldehyde resole. The more effective the reinforcing filler is, the less glycol is needed.

3. The pressure of water in the moulding compositions improves the fire properties and the flow properties of the compositions. The flow properties can also be improved by the use of non-reactive diluents, for example some glycols, glycol derivatives and organophosphates.

4. Preferred accelerators in the curing of the novel resoles of the invention are boric oxide and boric acid, which appear to act by forming a compound with the resole. Boric oxide also acts as a desiccant, and is suitably added to the moulding composition in a sufficient quantity to remove theoretically all or most of the water present or formed during the curing process. The boric oxide can be added in powder form, or as a hot solution in a glycol, of preferred concentration 10–20% by weight. Boric acid may be added as a powder, in aqueous solution, or in solution in an organic solvent. The boric oxide or boric acid is suitably added in an amount of 1 to 15%, by weight, based on the weight of the resole. Other suitable curing catalysts which may be used include latent acid catalysts such as hydrolysable esters and ammonium salts.

Boric oxide acts as a mildly acid catalyst after reacting with the water in the composition to yield boric acid, or it can be neutralised with an alkali to act mainly as a desiccant of pH values above or at neutral. A suitable composition comprises boric oxide in conjunction with an alkali solution such as potassium hydroxide dissolved in a glycol. For moulding compositions, a non-carbonated alkali or alkali buffer is necessary. The reaction system may also contain resorcinol or another highly reactive phenol derivative, which also acts as an accelerator for the resin cure. Other desiccants and cross-linking agnets may also be employed. The above comments regarding accelerators apply also when cure takes place under mildly acid conditions.

5. The maximum cure temperature for the resin systems of the invention are mainly governed by (a) the moulding pressure, (b) the presence in the resin system of water or other volatiles, including formaldehyde, and (c) the presence or absence of fillers and other reinforcements. Normally, the higher the filler content the higher the moulding/curing temperature which can be employed.

The moulding compositions of the invention may also contain a blowing agent, such as Arcton, in order to produce foamed products. Such products are particularly useful for thermal insulation and fire proofing applications. In these applications the composition preferably also comprises alumina trihydrate, mentioned hereinbefore as having exceptional fire-retardant and smoke-suppresant properties. The foams may be filled or unfilled, and suitably the base resins from which they are made are those having melamine:phenol molar ratios of more than 1:2.8. Other blowing agents include methylene chloride, volatile hydrocarbons such as n-pentane, and gases such as nitrogen or carbon dioxide which are either added from external sources or else chemically generated in situ. Foamed materials preferably contain boric oxide and an alkali carbonate for controlled release of carbon dioxide whilst simultaneously maintaining the pH mildly acid or close to neutral. They are suitably foamed at 40°–70° C. and post-cured at temperatures in excess of 80° C.

It will be seen that the invention provides a series of novel light-coloured liquid resins which can be readily produced, and which may be cured rapidly at mildly acid or near neutral pH, at temperatures in the range 90°–110° C., especially if accelerated by, for example, boric oxide. Compositions of the invention may contain useful basic fillers, being compatible with the very low level, if any, of acid present in the system. The curing of the resin compositions of the invention is fast, may take place without pressure, and is non-corrosive. The final products are also non-corrosive, are stable and, depending upon the additives used, have good colour stability. Products made using the compositions of the invention have shown negligible ingress of water upon immersion over several days at room temperature. Products made using the resin systems of the invention include, by way of example, building partitions and boards, roof sheeting, foamed boards, doors, and resin concrete.

The following Examples illustrate the formulations of representative moulding compositions and foams according to the invention.

EXAMPLE 1

Melamie-phenol-formaldehyde resole of molar ratios melamine-phenol:formaldehyde 1.0:3.4:8.4 containing 10% by weight of dipropylene glycol and approximately 15% by weight of water: 100 parts by weight dipropylene glycol: 12 parts by weight water: 10 parts by weight pH adjusted to 6.0 with butyl acid phosphate.

EXAMPLE 2

Melamine-phenol-formaldehyde resole of molar ratios and content of dipropylene glycol and water as in Example 1: 100 parts by weight dipropylene glycol: 12 parts by weight boric oxide powder: 6 parts by weight water: 5 parts by weight powdered talc: 20 parts by weight powdered titanium dioxide: 10 parts by weight pH adjusted to 7.0 with potassium hydroxide.

EXAMPLE 3

Melamine-phenol-formaldehyde resole of molar ratios and content of dipropylene glycol and water as in Example 1: 100 parts by weight dipropylene glycol: 10 parts by weight water: 14 parts by weight aluminium hydroxide: 300 parts by weight boric acid: 4 parts by weight.

EXAMPLE 4

Melamine-phenol-formaldehyde resole of molar ratios melamine:phenol:formaldehyde 1.0:2.7:5.8 containing 10% by weight of dipropylene glycol and approximately 15% by weight of water: 100 parts by weight hot 20% w/w solution of boric oxide in dipropylene glycol: 13 parts by weight boric oxide powder: 4 parts by weight aluminium hydroxide: 200 parts by weight water: 10 parts by weight.

EXAMPLE 5

Foaming Composition

Melamine-phenol-formaldehyde resole of molar ratio melamine:phenol:formaldehyde 1.0:1.8:4.5 containing 10% by weight of dipropylene glycol and approximately 15% by weight water: 100 parts by weight hot 20% w/w solution of boric oxide in dipropylene glycol: 20 parts by weight boric oxide powder: 5 parts by weight aluminium hydroxide: 100 parts by weight water: 10 parts by weight Plaster of Paris: 20 parts by weight talc: 20 parts by weight methylene chloride: 6 parts by weight.

EXAMPLE 6

Foaming Composition

Melamine-phenol-formaldehyde resole of molar ratios and content of dipropylene glycol and water as in Example 5: 100 parts by weight dipropylene glycol: 10 parts by weight 2-ethoxyethanol: 15 parts by weight boric oxide powder: 6 parts by weight anhydrous sodium carbonate: 5 parts by weight aluminium hydroxide: 60 parts by weight water: 10 parts by weight Triton BG10 (a non-ionic surfactant): 3 parts by weight Arcton 113: 6 parts by weight 50% aqueous phosphoric acid solution: 3 parts by weight talc powder: 30 parts by weight titanium dioxide: 5 parts by weight.

EXAMPLE 7

Melamine-phenol-formaldehyde resole of molar ratios and content of dipropylene glycol and water as in Example 1: 100 parts by weight dipropylene glycol: 6 parts by weight butyl carbitol acetate: 6 parts by weight butyl acid phosphate: 6 parts by weight water: 5 parts by weight.

EXAMPLE 8

Melamine-phenol-formaldehyde resole of molar ratios and content of dipropylene glycol and water as in Example 1: 100 parts by weight water: 8 parts by weight dipropylene glycol: 12 parts by weight boric acid: 3 parts by weight titanium dioxide: 12 parts by weight polyvinyl alcohol: 10 parts by weight china clay: 5 parts by weight pH adjusted to 7.0 with potassium hydroxide.

The composition of Example 1 is free-flowing at 25° C. and can give translucent mouldings.

The composition of Example 2 is free-flowing at 25° C.–35° C., before the addition of the boric oxide, and is then quick-setting.

The compositions of Examples 3 and 4 are viscous masses at 30° C. They are preferably cured at temperatures of 90° to 130° C., depending on the moulding pressures.

The compositions of Examples 5 and 6 foam at 40°–60° C., and are preferably post-cured at 90°–100° C.

The composition of Example 7 is free-flowing at 25° C. The preferred curing temperature is 80°–120° C., depending on the pressure of moulding. The mouldings produced can be translucent.

The composition of Example 8 is free-flowing at 25°–35° C., and the preferred cure temperature is 90°–125° C.

Those compositions containing boric oxide or boric acid are quick setting-gelling materials, normally, gelling within 30 seconds to 5 minutes, and fully curing after a further period of time.

EXAMPLE 9

Moulding Composition

Melamine-phenol-urea-formaldehyde resole of molar ratio 1.0:3:0.4:8.4 containing about 20% water and 15% dipropylene glycol by weight: 100 parts by weight triethylene glycol: 3 parts by weight propylene glycol: 3 parts by weight water: 5 parts by weight aluminium hydroxide powder: 30 parts by weight china clay powder: 15 parts by weight talc powder: 15 parts by weight mica powder: 15 parts by weight 25% aqueous solution of diammonium phosphate: 3 parts by weight 15% aqueous solution of monoammonium phosphate: 4 parts by weight glass fibre, chopped rovings, 3 mm long: 4 parts by weight.

The composition is preferably cured at pressures above 80 p.s.i.g. and temperatures between 100° C. and 125° C. It can also be cured at normal pressure and temperatures between 90° and 95° C.

EXAMPLE 10

Foaming Composition

Resole of molar ratio melamine:phenol:urea:formaldehyde=1:2:0.5:7.0 containing about 20% water and 20% dipropylene glycol: 100 parts by weight triethylene glycol: 5 parts by weight aluminium hydroxide: 70 parts by weight water: 10 parts by weight talc: 35 parts by weight Dolomite powder: 5 parts by weight Arcton 113: 8 parts by weight 50% phosphoric acid solution in water: 3 parts by weight boron oxide powder: 3 parts by weight boric acid powder: 2 parts by weight silicone surfactant: 2 parts by weight.

This composition may be foamed between 40° C. and 60° C. and post-cured at 95° C.–100° C.

EXAMPLE 11

Moulding Composition

Melamine-phenol-formaldehyde resole of molar ratio 1:1.5:5.5 containing 15% water, 10% dipropylene glycol and 10% triethylene glycol: 100 parts by weight water: 5 parts by weight polyvinyl alcohol: 10 parts by weight 50% aqueous phosphoric acid solution: 2 parts by weight dicyandiamide powder: 2 parts by weight 3–6 mm long glass fibre: 3 parts by weight titanium dioxide pigment: 5 parts by weight.

This composition is preferably moulded at pressures above 20 p.s.i.g. but can also be moulded at normal pressure. Recommended temperatures are 90° to 125° C., dependent on moulding pressures.

We claim:

1. A method of forming a shaped article comprising forming into shape a composition comprising:
   (i) a melamine-phenol-formaldehyde resole wherein the molar ratio of melamine:phenol is in the range 1:4.7 to 1:0.29; wherein for each mole of melamine there are 1.5 to 3 moles of formaldehyde; and wherein for each mole of phenol there are 1.2 to 2 moles of formaldehyde, the formaldehyde requirements being additive;
   (ii) a glycol or glycol derivative in an amount of at least 15% by weight of the phenol in the resole plus at least 50% by weight of the melamine in the resole; and
   (iii) water, the water being not over 35% by weight based on the weight of resole, and causing the resole to cure at a pH in the range 4.0 to 8.6.

2. A method as claimed in claim 1 wherein up to 40% by weight of the melamine in the resole (i) is replaced with urea or a substituted urea.

3. A method as claimed in claim 1 wherein the molar ratio of melamine:phenol in the resole (i) is in the range 1:3.5 to 1:0.29.

4. A method as claimed in claim 1 wherein for each mole of phenol in the resole (i) there are 1.5 to 1.8 moles of formaldehyde.

5. A method as claimed in claim 1 wherein the glycol (ii) is monopropylene glycol, dipropylene glycol or triethylene glycol.

* * * * *